United States Patent [19]
Wood et al.

[11] 3,856,869
[45] Dec. 24, 1974

[54] PROCESS FOR 6-ISOPROPYL-1,1,4-TRIMETHYLINDAN

[75] Inventors: Thomas F. Wood, Wayne; Emanuel Heilweil, Fairfield, both of N.J.

[73] Assignee: Givaudan Corporation, Clifton, N.J.

[22] Filed: June 1, 1973

[21] Appl. No.: 365,883

[52] U.S. Cl. .......... 260/668 F, 260/592, 260/668 A
[51] Int. Cl. ............................................. C07c 15/20
[58] Field of Search ............. 260/592, 668 A, 668 F

[56] References Cited
UNITED STATES PATENTS
3,506,730   4/1970   Marchese et al................ 260/668 R Primary Examiner—C. Davis
Attorney, Agent, or Firm—Thomas Cifelli, Jr.

[57] ABSTRACT

A process for the preparation of 6-isopropyl-1,1,4-trimethylindan wherein 7-isopropyl-1,1,4-trimethylindan undergoes isomerization to 6-isopropyl-1,1,4-trimethylindan by contact with an effective amount of an aluminum halide catalyst such as $AlCl_3$.

9 Claims, No Drawings

PROCESS FOR 6-ISOPROPYL-1,1,4-TRIMETHYLINDAN

BACKGROUND OF THE INVENTION

1. Field of the Invention

This invention relates to a process for the preparation of 6-isopropyl-1,1,4-trimethylindan and, more particularly, to the preparation of 6-isopropyl-1,1,4-trimethylindan by the isomerization of 7-isopropyl-1,1,4-trimethylindan or mixtures containing the latter. Further, this invention relates to a practical process for the preparation of ethyl 6-isopropyl-1,1,4-trimethyl-5-indanyl ketone, a known herbicide, by reacting 6-isopropyl-1,1,4-trimethylindan with propionyl chloride in the presence of an aluminum halide catalyst.

2. The Prior Art

Ethyl 6-isopropyl-1,1,4-trimethyl-5-indanyl ketone is a compound exhibiting substantial pre-emergence herbicidal activity. The ketone is ecologically acceptable in contrast to herbicides presently commercially available as the compound is biodegradable, does not have an objectionable odor, is nonirritating to the skin and has very low toxicity. The compound is particularly valuable for the elimination of grasses from food crops such as corn, beans, soybeans and rice. The herbicidal activity and a method for the preparation of ethyl 6-isopropyl-1,1,4-trimethyl-5-indanyl ketone is more fully described in U.S. Pat. Nos. 3,393,994 and 3,509,215.

In the preparation of ethyl 6-isopropyl-1,1,4-trimethyl-5-indanyl ketone, 6-isopropyl-1,1,4-trimethylindan is reacted with propionyl chloride in the presence of an $AlCl_3$ catalyst in accordance with the equation:

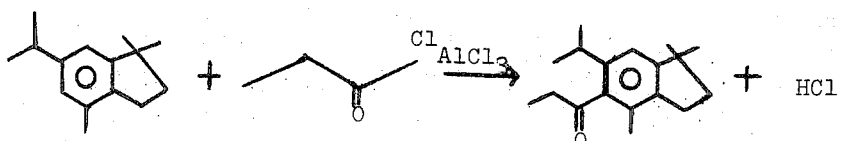

Heretofore, 6-isopropyl-1,1,4-trimethylindan was prepared by the reaction of m-cymene with isoprene in the presence of an acid catalyst such as sulfuric acid. The preparation of 6-isopropyl-1,1,4-trimethylindan is more fully described in U.S. Pat. No. 3,240,829. By the reaction of m-cymene and isoprene, the product 6-isopropyl-1,1,4-trimethylindan is obtained in excellent purity and high yield. Unfortunately, this method of preparing 6-isopropyl-1,1,4-trimethylindan is presently impractical as m-cymene is not commercially available and as a matter of fact is difficult to obtain even on a laboratory scale. Cymene is prepared by the isopropylation of toluene. The isopropylation reaction produces an isomeric mixture of m-cymene with major amounts of o- and p-isomers, i.e., about 40%.

The m-, o- and p-isomers of cymene have closely related physical properties and as a result the isomers cannot be readily separated by conventional methods such as distillation or fractional crystallization. The methods which are available for separation of the isomers are very tedious and time-consuming procedures which require elaborate and expensive equipment and which are impractical for all but very small quantities of m-cymene. The presence of large amounts of unseparable o- and p-isomers in the cymene charge used in the preparation of 6-isopropyl-1,1,4-trimethylindan causes unacceptably low yields of 6-isopropyl-1,1,4-trimethylindan to be obtained.

In view of the difficulties of resolving isomeric mixtures of cymene, there exists the need for an alternate route to the preparation of ethyl 6-isopropyl-1,1,4-trimethyl-5-indanyl ketone.

SUMMARY OF THE INVENTION

In accordance with the present invention, there is provided a method for the preparation of 6-isopropyl-1,1,4-trimethylindan which comprises reacting either pure 7-isopropyl-1,1,4-trimethylindan or a mixture of 6- and 7-isopropyl-1,1,4-trimethylindans, derived from isoprene-cyclialkylation of p-cymene or m,p-cymene mixture, with an effective amount of an aluminum halide catalyst at temperatures ranging from ambient to about 100°C.

In accordance with another aspect of the present invention, there is provided a commercially feasible method for the preparation of ethyl 6-isopropyl-1,1,4-trimethyl-5-indanyl ketone, an excellent herbicide, by reacting the 6-isopropyl-1,1,4-trimethylindan obtained in accordance with the present invention with propionyl chloride in the presence of an effective amount of an aluminum halide catalyst.

By the isomerization process of the present invention, yields of approximately 80% of the 6-isopropyl-1,1,4-trimethylindan are obtained, and the crude reaction product generally shows a ratio of 6-isopropyl to 7-isopropyl-1,1,4-trimethylindan of 92:8.

The results obtained in accordance with the process of the present invention would not appear to be predictable from the prior art teachings on the isomerization of isopropylated benzenes using aluminum halide catalysts. In general, the prior art teaches that the isopropyl group is labile and the presence of the catalyst causes dealkylation and removal of the isopropyl group resulting in the formation of undesirable by-products. Thus, Schorger, J. Am. Chem. Soc. 39, 2671 (1917) found that the reaction of p-cymene in the presence of anhydrous $AlCl_3$ resulted in a reaction product containing five different compounds with extensive removal of the isopropyl group. U.S. Pat. No. 2,744,149 discloses the isomerization of cymenes by heating with 0.1 to 2 mole percent anhydrous $AlCl_3$ at 80° – 150°C. wherein the isomerized reaction product contains 58 mole percent cymenes, 19 mole percent toluene and 22 mole percent diisopropyltoluene indicating that substantial disproportionation had occurred.

Nightingale et al., J. Am. Chem. Soc. 78, 1225 (1956), isomerized 1,3-dimethyl-4-isopropylbenzene to 1,3-dimethyl-5-isopropylbenzene using an $AlCl_3$ catalyst and the 1,3-dimethyl-5-isopropylbenzene was obtained in only 34.6% yield, the isomerization reaction product containing 38.6% of the 1,3-dimethyl-4-isopropyl-benzene starting material. Although U.S. Pat. No. 3,506,703 teaches the use of a boron trifluoride-phosphoric acid catalyst for the isomerization of alkyl aromatic hydrocarbons such as 1,2- and 1,4-diisopropyl-benzenes to 1,3-diisopropylbenzene and 1-isopropylnapthalene to 2-isopropylnapthalene, the catalyst is totally ineffective for the isomerization of 7-isopropyl-1,1,4-trimethylindan to 6-isopropyl-1,1,4-trimethylindan.

PREFERRED EMBODIMENTS

The 7-isopropyl-1,1,4-trimethylindan starting material used in the isomerization process of the present invention is prepared by the cyclialkylation reaction of p-cymene with isoprene in the presence of an acid catalyst such as 75 – 96% sulfuric acid at a temperature within the range of −30°C. to 150°C. in accordance with the following equation:

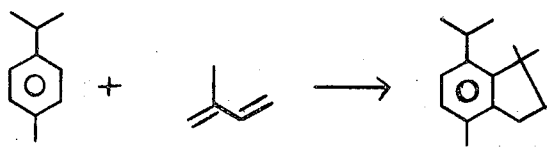

The reaction conditions used to prepare 7-isopropyl-1,1,4-trimethylindan are more fully described in U.S. Pat. No. 3,240,829, the disclosure of which is incorporated herein by reference.

An alternate procedure to the preparation of 7-isopropyl-1,1,4-trimethylindan from p-cymene with isoprene is the reaction of isoprene with a mixture of m- and p-cymene obtained by the isopropylation of toluene in the presence of anhydrous $AlCl_3$ in accordance with the method of Allen et al, J. Am. Chem. Soc. 83,2803 (1961).

The isomerization of 7-isopropyl-1,1,4-trimethylindan to 6-isopropyl-1,1,4-trimethylindan is effected in the presence of an aluminum halide catalyst such as $AlCl_3$ or $AlBr_3$ in accordance with the following equation:

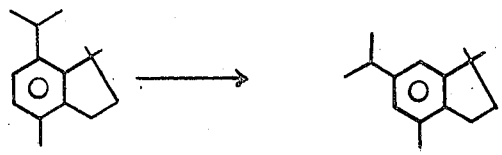

$AlCl_3$ is the preferred aluminum halide catalyst. The concentration of $AlCl_3$ employed in the isomerization reaction may vary from about 1 to about 10% by weight of the starting compound. If anhydrous aluminum chloride is used as the catalyst material, it is desirable to add a catalyst promotor such as a hydrogen halide and preferably hydrogen chloride to the reaction to increase the rate of isomerization. The addition of 1 to 5 weight percent of anhydrous HCl based on the 7-isopropyl-1,1,4-trimethylindan has been found satisfactory for this purpose.

When anhydrous $AlCl_3$ is used as the catalyst, the temperature for the reaction ranges from about 20° to 100°C. and isomerization at an acceptable rate occurs at a temperature range of 55° to 65°C.

The time of the reaction using anhydrous $AlCl_3$ will vary depending upon other reaction conditions such as temperature. In general, a reaction time of from 4 to 72 hours is ordinarily sufficient to obtain optimum results. When the reaction is conducted at room temperature, e.g., 24° to 30°C., the time of reaction will range from 48 to 72 hours. At higher temperatures, e.g., 50° to 70°C., the reaction proceeds more rapidly, e.g. about 4 to 8 hours.

More rapid isomerization reactions are possible using as the catalyst material a complex of aluminum chloride and an alkyl halide. Of the alkyl halides, isopropyl chloride is preferred as it is inert to the isomerization reaction conditions and does not result in transalkylation and the resultant formation of undesirable by-products. When the $AlCl_3 \cdot i$-$C_3H_7Cl$ complex is used as the catalyst, optimum results are obtained within 1 to 5 hours when the temperature of the isomerization reaction ranges from 50° to 65°C.

The $AlCl_3 \cdot i$-$C_3H_7Cl$ complex is conveniently prepared by mixing approximately equimolar amounts of $AlCl_3$ and isopropyl chloride at temperatures of 55° to 65°C.

When using the catalyst complex, the reaction mixture should be vigorously agitated to provide intimate contact between the 7-isopropyl-1,1,4-trimethylindan and the catalyst complex.

Inert solvents such as nitrobenzene and carbon disulfide may be incorporated in the isomerization reaction mixture but it is preferred to conduct the reaction in the absence of a solvent.

After the desired stage of isomerization has been reached, the catalyst is inactivated or decomposed and the reaction mixture is settled to separate the catalyst phase from the organic, 6-isopropyl-1,1,4-trimethylindan phase. The organic phase is washed with water to remove any catalyst residues and then subjected to distillation to separate the 6-isopropyl-1,1,4-trimethylindan.

The following example will serve to further illustrate the invention.

EXAMPLE

1. Preparation of 6-Isopropyl-1,1,4-Trimethylindan by the Isomerization of 7-Isopropyl-1,1,4-Trimethylindn A reaction mixture of 493 grams of 7-isopropyl-1,1,4-trimethylindan (99%), 12.3 grams of anhydrous, granular aluminum chloride and 12.3 grams of isopropyl chloride was charged to a 2-liter, 3-neck Pyrex reaction flask equipped with agitator, thermometer, reflux condenser and heating mantle. The reaction mixture was slowly warmed to 55°C. with stirring. At this temperature the $AlCl_3 \cdot i$-$C_3H_7Cl$ complex began to go into solution and a mildly exothermic isomerization reaction began. The reaction temperature was maintained at 60°C. for 2 hours. The reaction mixture was then cooled to 56°C. and 262 grams of 10% caustic soda was added with stirring to the reaction product over a 2 minute period. The temperature dropped to 51°C. and the stirring was continued for an additional 30 minutes to completely decompose the aluminum chloride complex during which time the temperature dropped to 34°C. The reaction product was transferred to a separatory funnel and allowed to settle. The aqueous lower layer was separated and the remaining oil layer washed with 262 grams of 10% aqueous sodium bicarbonate solution. The washed oil layer weighed 492 grams.

Vapor phase chromatographic analysis indicated that the ratio of 6-isopropyl- to 7-isopropyl-1,1,4-trimethylindan in the oil layer was 92:8.

After distillation, the desired product, b.p. 77° – 79°C. (at 1 mm), n20/D = 1.5100, was obtained as the main fraction amounting to 391.5 grams representing a yield of 79.5%.

2. Preparation of Ethyl 6-Isopropyl-1,1,4-Trimethyl-5-Indanyl Ketone

To a 2-liter, 3-neck, Pyrex reaction flask equipped with agitator, thermometer, dropping funnel and cooling bath was charged 670 grams ethylene dichloride. The flask was cooled to −5°C. and 233 grams anhydrous $AlCl_3$ (1.74 moles) was added, the temperature being maintained at ± 5°C.

To the flask was added 177 grams (1.91 moles) of propionyl chloride over a 15 minute period while the temperature was maintained at −5° to −2°C. Substantially all the $AlCl_3$ reacted with the formation of a soluble complex. To the reaction mixture was charged, 337 grams 6-isopropyl-1,1,4-trimethylindan (1.67 moles) prepared in (1) above, over a 2 hour period while the temperature was maintained at about −3°C. The reaction mixture was stirred for an additional 2 hours after which time it was poured into 1100 grams of cracked ice with stirring. The color of the reaction mixture turned yellow and the temperature rose to 30°C. The lower aqueous layer was removed after settling. The remaining organic layer was washed with 700 grams of 10% soda ash solution and then with 500 grams of an aqueous 10% sodium bicarbonate solution.

After distillation of the solvent there was recovered a nearly colorless crude product, congealing at 53.2°C. as the main fraction amounting to 405 grams, representing a yield of 94%.

Vapor phase chromatographic analysis of the crude product indicated that it consisted of 91.4% of ethyl 6-isopropyl-1,1,4-trimethyl-5-indanyl ketone.

Vacuum distillation of the crude product yielded a colorless product, c.p. 54.2°C., b.p. 121°C. (at 1mm). The pure ketone was obtained from the vacuum distilled product by crystallization from methanol.

The pure ketone was a colorless solid, m.p. 65° – 66°C., b.p. 132°C. (2 mm), insoluble in water, soluble in most organic solvents, odorless and non-toxic having an $LD_{50}$ of 4.5 g/kg. It was non-irritating to the skin and produced only slight rabbit eye irritation of short duration.

What is claimed is:

1. A process for the preparation of 6-isopropyl-1,1,4-trimethylindan which comprises contacting 7-isopropyl-1,1,4-trimethylindan or a mixture of 7-isopropyl-1,1,4-trimethylindan and 6-isopropyl-1,1,4-trimethylindan, under isomerizing conditions with an effective amount of an aluminum halide catalyst.

2. The process of claim 1 wherein the catalyst is $AlCl_3$.

3. The process of claim 1 wherein the catalyst is a complex of $AlCl_3$ and isopropyl chloride.

4. The process of claim 1 wherein the catalyst is present in the reaction at a concentration of about 1 to 10% by weight of the 7-isopropyl-1,1,4-trimethylindan or of the 7-isopropyl-1,1,4-trimethylindan-6-isopropyl-1,1,4-trimethylindan mixture.

5. The process of claim 1 wherein about 1 to 5 weight percent of a hydrogen halide based on the 7-isopropyl-1,1,4-trimethylindan or on the mixture of 7-isopropyl-1,1,4-trimethylindan and 6-isopropyl-1,1,4-trimethylindan is present in the reaction.

6. The process of claim 1 wherein the 7-isopropyl-1,1,4-trimethylindan or the mixture of 7-isopropyl-1,1,4-trimethylindan and 6-isopropyl-1,1,4-trimethylindan is contacted with the aluminum halide catalyst at a temperature within the range of from about 20° to about 100°C. for a period of time within the range of from about 1 to about 72 hours.

7. The process of claim 3 wherein the 7-isopropyl-1,1,4-trimethylindan or the mixture of 7-isopropyl-1,1,4-trimethylindan and 6-isopropyl-1,1,4-trimethylindan is contacted with the $AlCl_3$-isopropyl chloride complex catalyst at a temperature within the range of from about 50° to about 65°C for a period of time within the range of about 1 to about 5 hours.

8. A process for the preparation of 6-isopropyl-1,1,4-trimethylindan which comprises preparing a cymene composition containing the para isomer, reacting the cymene composition with isoprene to prepare a reaction product which contains 7-isopropyl-1,1,4-trimethylindan, contacting the 7-isopropyl-1,1,4-trimethylindan containing reaction product with an aluminum halide catalyst to effect the isomerization thereof to 6-isopropyl-1,1,4-trimethylindan.

9. The process of claim 8 wherein the 7-isopropyl-1,1,4-trimethylindan is isolated from the 7-isopropyl-1,1,4-trimethylindan containing reaction product prior to being contacted with the aluminum halide catalyst.

* * * * *